(12) United States Patent
Haubrich et al.

(10) Patent No.: US 9,764,763 B2
(45) Date of Patent: Sep. 19, 2017

(54) ARTICULATED VEHICLE AND ARTICULATION JOINT ARRANGEMENT FOR SUCH A VEHICLE

(71) Applicant: BOMAG GmbH, Boppard (DE)

(72) Inventors: Thomas Haubrich, Gödenroth (DE); Thomas Klein, Wehr (DE); Stephan Jakobs, Gondershausen (DE)

(73) Assignee: BOMAG GmbH, Boppard (DE)

( * ) Notice: Subject to any disclaimer, the term of this patent is extended or adjusted under 35 U.S.C. 154(b) by 141 days.

(21) Appl. No.: 14/414,246

(22) PCT Filed: Jul. 12, 2013

(86) PCT No.: PCT/EP2013/002081
§ 371 (c)(1),
(2) Date: Jan. 12, 2015

(87) PCT Pub. No.: WO2014/009023
PCT Pub. Date: Jan. 16, 2014

(65) Prior Publication Data
US 2015/0210316 A1    Jul. 30, 2015

(30) Foreign Application Priority Data

Jul. 13, 2012 (DE) .................. 10 2012 014 001

(51) Int. Cl.
*B62D 12/00* (2006.01)
*B62D 53/02* (2006.01)
*E01C 19/00* (2006.01)

(52) U.S. Cl.
CPC ........... *B62D 12/00* (2013.01); *B62D 53/021* (2013.01); *E01C 19/00* (2013.01)

(58) Field of Classification Search
CPC . B60D 12/00; B60D 2001/546; B60D 53/021
See application file for complete search history.

(56) References Cited

U.S. PATENT DOCUMENTS 7,694,772 B1 * 4/2010 Doll .................. B60T 13/686
180/235

FOREIGN PATENT DOCUMENTS

DE           1 241 719 B    6/1967
DE     20 2005 021 280 U1   9/2007
(Continued)

OTHER PUBLICATIONS

Espacenet, English Machine Translation of FR1418013A, published Nov. 19, 1965, retrieved from http://worldwide.espacenet.com on Dec. 29, 2014 (2 pages).

(Continued)

*Primary Examiner* — Kevin Hurley
(74) *Attorney, Agent, or Firm* — Wood Herron & Evans LLP

(57) ABSTRACT

The present invention relates to an articulated pendulum joint for an articulated vehicle, especially a construction machine. It comprises a front connection element for connecting a front frame part of the articulated vehicle, a rear connection element for connecting a rear frame part of the articulated vehicle, and an articulation joint, via which the front connection element and the rear connection element are mutually connected in a pivotable manner relative to each other about a steering axis ($A_S$). A pendulum joint is further provided, via which the front connection element and the rear connection element are mutually connected in a twistable manner relative to each other about a pendulum axis ($A_T$), wherein the steering axis ($A_S$) of the articulation joint is inclined about an acute angle α relative to the pendulum axis ($A_T$). The present invention further relates to an articulated vehicle, especially an articulation-steered construction machine, comprising a front frame part and a rear frame part on which driving means are respectively arranged (Continued)

and on which a joint arrangement of the type described above is provided.

13 Claims, 12 Drawing Sheets

(56) References Cited

FOREIGN PATENT DOCUMENTS

| | | |
|---|---|---|
| EP | 1 111 134 A2 | 6/2001 |
| FR | 1 418 013 A | 11/1965 |
| JP | 61-81279 A | 4/1986 |

OTHER PUBLICATIONS

Espacenet, English Machine Translation of Abstract for DE1241719B, published Jun. 1, 1967, retrieved from http://worldwide.espacenet.com on Dec. 29, 2014 (1 page).

Espacenet, English Machine Translation of Abstract for JPS6181279A, published Apr. 24, 1986, retrieved from http://worldwide.espacenet.com (1 page).

Espacenet, English Machine Translation of EP1111134A2, published Jun. 27, 2001, retrieved from http://worldwide.espacenet.com on Dec. 29, 2014 (7 pages).

Espacenet, English Machine Translation of DE202005021280U1, published Sep. 27, 2007, retrieved from http://worldwide.espacenet.com on Dec. 29, 2014 (20 pages).

European Patent Office, International Search Report and Written Opinion of the International Searching Authority, International Application No. PCT/EP2013/002081, mailed on Sep. 18, 2013 (10 pages).

The International Bureau of WIPO, English Machine Translation of International Preliminary Report on Patentability, International Application No. PCT/EP2013/002081, mailed Jan. 22, 2015 (11 pages).

The International Bureau of WIPO, International Preliminary Report on Patentability, International Application No. PCT/EP2013/002081, mailed Jan. 22, 2015 (9 pages).

* cited by examiner

ARTICULATED VEHICLE AND ARTICULATION JOINT ARRANGEMENT FOR SUCH A VEHICLE

CROSS-REFERENCE TO RELATED APPLICATIONS

This application is a submission under 35 U.S.C. §371 of International Application No. PCT/EP2013/002081, filed Jul. 12, 2013, which claims priority to German Application No. 10 2012 014 001.0, filed Jul. 13, 2012, the disclosures of which are hereby expressly incorporated by reference herein in their entireties.

FIELD OF THE INVENTION

The present invention relates to an articulated vehicle and especially a construction machine as well as a joint arrangement for such a vehicle, comprising a front connection element for connecting a front frame part of the articulated vehicle, a rear connection element for connecting a rear frame part of the articulated vehicle, and an articulation joint by means of which the front connection element and the rear connection element can be pivoted about a steering axis relative to each other to carry out a steering motion between the front frame part and the rear frame part, and at least one pendulum joint by means of which the front connection element and the rear connection element are twistable about a pendulum axis relative to each other to carry out a pendulum motion between the front frame part and the rear frame part.

BACKGROUND OF THE INVENTION

The principle of articulated steering has led to the consequence in vehicles, and especially self-propelled construction machines such as wheel loaders, transporters, vibrational rollers or similar construction machines, that chassis frames, which usually comprise rigid drive axles, are provided with substantially improved manoeuvrability. This manoeuvrability is produced by dividing the frame. While the front axle is usually connected to the front frame part, the combination of articulation joint and pendulum joint, which may also be referred to below as articulated pendulum joint, ensures permanent ground contact both of the front and also a rear axle which is suspended on the rear frame part.

In the case of articulation-steered vehicles and vehicles steered by articulated pendulum joints, in particular, the front frame part and the rear frame part are connected to each other via a rigidly arranged articulated pendulum joint. As a result, such a vehicle can be steered about an articulation or steering axis extending substantially perpendicularly to the surface of the ground, wherein a relative pivoting of the front frame part in relation to the rear frame part about a steering axis extending through the articulation joint is possible. In order to achieve improved ground contact especially in the case of rigid axles, and, in particular, in the case of road surfaces that are very uneven, the articulation joint is mostly combined with a pendulum joint as already explained above, so that a torsional movement of the front frame part relative to the rear frame part is at least possible within a limited angle. Such a joint is described, for example, in EP 1111134 A2.

Such vehicles steered by an articulation joint, and especially vehicles with an articulated pendulum joint, are very reliable. However, a relatively large free space is required by the combination comprised of the articulated pendulum joint in order to prevent collisions between the front and rear frame part in the case of full steering and pendulum angle.

The tipping resistance is disadvantageous in such vehicles, especially in the turned-in state. Furthermore, unsteady directional stability of the machine may further occur under certain circumstances as a result of the division of the axles.

It is a further disadvantage that very high loads occur on the outside wheels as a result of the very narrow turning radii, which loads may lead to damage to the road and also very high loads on the material.

A road roller with an articulated pendulum joint is known from EP 1111134 A2, in which the articulation joint is bridged by a coupling rod mounted in an articulated manner. The coupling rod produces an inclination between the front and rear frame part of the road roller during a steering process.

A wheel loader with an articulation joint is further known from DE 1241719 B, whose axis is inclined in the forward direction. Pendulum compensation occurs via the rear axle, which is arranged in pendulum fashion about the longitudinal axis of the vehicle.

DE 202005021280 U1 describes an all-terrain vehicle in form of a harvester with an articulation joint which comprises a rotational axis which is slightly inclined in the forward direction.

It is the object of the present invention to provide a joint arrangement and a vehicle with such a joint arrangement which allows improved driving characteristics in combination with a simultaneous reduction in the machine loads and which further allows a more compact overall configuration.

SUMMARY OF THE INVENTION

This object is achieved, in particular, by a joint arrangement for an articulated vehicle and a construction machine, in particular, in such a way that the steering axis of the articulation joint is inclined about an angle to the pendulum axis, and that a limitation of the pendulum angle is provided depending on the inclination of the steering axis and the steering angle. The limitation is preferably formed by a finger on the front frame part and a stop for the finger on the rotational body or the torsion bearing element.

Furthermore, this object is achieved by an articulated vehicle and, in particular, an articulation-steered construction machine, comprising a front frame part and a rear frame part on which driving means are arranged, and which comprises a joint arrangement of the kind as described above and further specified below.

Any component is understood as being the rear or front connection element which can be used for force transmission between the front frame part or the rear frame part and the joint arrangement. As a result, both integral and multi-part connection constructions can be considered.

A relevant feature of the joint arrangement according to one aspect of the present invention is the arrangement of the steering axis of the articulation joint which is inclined about the angle α relative to the pendulum axis of the pendulum joint. According to the present invention, the steering axis is arranged to be inclined about an acute angle α relative to the pendulum axis.

In the case of a vehicle of the kind described above, comprising a front frame part and a rear frame part, an inclination of the steering axis of the articulation joint about the acute angle α relative to the horizontal of the vehicle is thus obtained, in particular, and thus also substantially relative to the surface of the ground on which the vehicle is moved.

As will be explained below in greater detail, such an inclined arrangement of the steering axis of the articulation joint leads to an improvement in the tipping resistance of the machine, because a resultant force counteracts the movement of a potentially tipping vehicle as a result of the construction. The resulting stabilisation function is thus obtained directly from the inclination of the pendulum axis during the steering process caused by the construction, since this axis does not move within its plane during the steering process but on a curved trajectory.

The inclined steering axis of the articulation joint further improves the directional stability of the machine, because a lifting of the centre of gravity of the machine occurs as a result of the axial inclination during the steering movement. The resulting restoring force improves directional stability, wherein the advantages of the articulation-steered frame and, in particular, its manoeuvrability are still maintained.

The geometrically caused restoring force further has effects on the load distribution, especially on the outer wheels of the respective frame parts 4, 8, because the outer wheel in the curve is always relieved by the inclination of the pendulum axis during the steering process. This leads to a much more even material loading of the vehicle in cooperation with active curve forces.

An angle of between 65° and 85°, and 80°, in particular, has proven to be especially advantageous for the angle of inclination α, because in this case optimal cooperation is achieved between pendulum limitation and potential steering angle.

The steering axis can principally be inclined in the direction of the front connection element. The steering axis is preferably inclined in the direction of the rear connection element, because it is this geometric configuration, in particular, which amplifies the above effects during operation of the vehicle in its main production or transport direction.

In a special embodiment, the rear connection element comprises a yoke element with at least two mutually spaced bearing elements and the front connection element comprises at least one bearing shaft with at least two bearing counter-elements which are complementary to said bearing elements and which are in force-locking operative engagement with the bearing elements or vice versa. Vice versa means that also the front connection element can comprise a yoke element with at least two mutually spaced bearing elements and the rear connection element can comprise at least one bearing shaft with at least two bearing counter-elements complementary to said bearing elements. Vice versa further means that the bearing elements or the bearing counter-elements can also be arranged on the respectively other described components. The yoke element consequently defines an axis which defines the steering axis of the articulation joint.

The inclined steering axis preferably extends through the bearing counter-elements.

For the formation of the articulation joint, in particular, at least one bearing counter-element preferably comprises a spherical head or a similar projection, and the bearing element comprises a complementary spherical head receptacle or a similar receptacle for the projection, or vice versa. As already described above, vice versa means that the spherical head could obviously also be arranged on the bearing element and the spherical head receptacle on the bearing counter-element. Such an arrangement of a spherical head allows a wear-free arrangement of the joint arrangement, and especially one that is free from secondary bending, in which, in particular, the torsional forces acting on the pendulum joint can be transmitted free from damage.

Vice versa shall be understood here in such a way that obviously the yoke element could also be arranged on the front connection element and the bearing shaft on the rear connection element.

The bearing shaft is preferably arranged in this connection especially in an inclined fashion parallel to the steering axis. This means that the bearing shaft on the front or rear connection element, depending on the embodiment, is also arranged in an inclined manner in relation to the pendulum axis of the pendulum joint (in the non-turned-in state), wherein said inclination, in particular, extends parallel to the inclination with respect to the steering axis. The bearing shaft thus forms the steering axis, so that the bearing counter-elements which are arranged thereon must be arranged concentrically about the steering axis.

The bearing elements are arranged in one embodiment on an integrally formed bearing shaft. Such an integral bearing shaft is then arranged in an inclined manner especially parallel to the steering axis relative to the pendulum axis. In this case, both an integral design of the bearing shaft and also a multipart arrangement of such a bearing shaft are possible, which is then assembled to form a continuous component. The bearing shaft can be arranged as a separate component which is connected to one of the frame parts or in an integral manner as an integral component of one of the frame parts.

In another embodiment, the at least two bearing shafts extend especially perpendicularly to the pendulum axis, which bearing shafts are arranged with respect to an axis perpendicularly to said pendulum axis in an offset manner with respect to each other along the pendulum axis. In the case of an arrangement of respective bearing elements or bearing counter-elements on the two bearing shafts which are arranged in an offset manner with respect to each other, a steering axis for the articulation joint is obtained which is inclined by the two bearing elements or bearing counter-elements. A highly compact articulation joint construction can thus be ensured in this way.

The bearing elements of the yoke element can be arranged depending on the installation situation as an upper bearing element and a bottom bearing element. In a preferred embodiment, the bottom bearing element is arranged with respect to an axis perpendicularly to the pendulum axis along the pendulum axis in an offset manner with respect to the upper bearing element, or vice versa. Depending on the main working direction of the vehicle, the bottom bearing element is preferably offset in the direction of said working direction to the front and the upper bearing element in the direction of said working direction to the rear. This produces a steering axis of the articulation joint which is inclined to the rear.

It is possible that at least the one bearing shaft is arranged on a torsion bearing element which engages with a torsion pin or a similar projection in a rotating manner in a torsion pin receptacle or a similar projection receptacle, or vice versa. As a result of the arrangement of the at least one bearing shaft on such a torsion bearing element, a highly compact joint arrangement with a pivoting and pendulum function is obtained. The bearing shafts can be fixed to the torsion bearing element in the manner as described above as bearing shafts arranged in several parts and can be welded in or produced in an integral manner. It is also possible to provide the torsion bearing element with a borehole and to guide an integrally arranged bearing shaft through said borehole, so that free ends are obtained on which the bearing elements or bearing counter-elements can be arranged.

BRIEF DESCRIPTION OF THE DRAWINGS

The present invention will be described below in closer detail by reference to embodiments shown in the drawings. In the schematic figures.

DETAILED DESCRIPTION OF THE INVENTION

Figure 1:
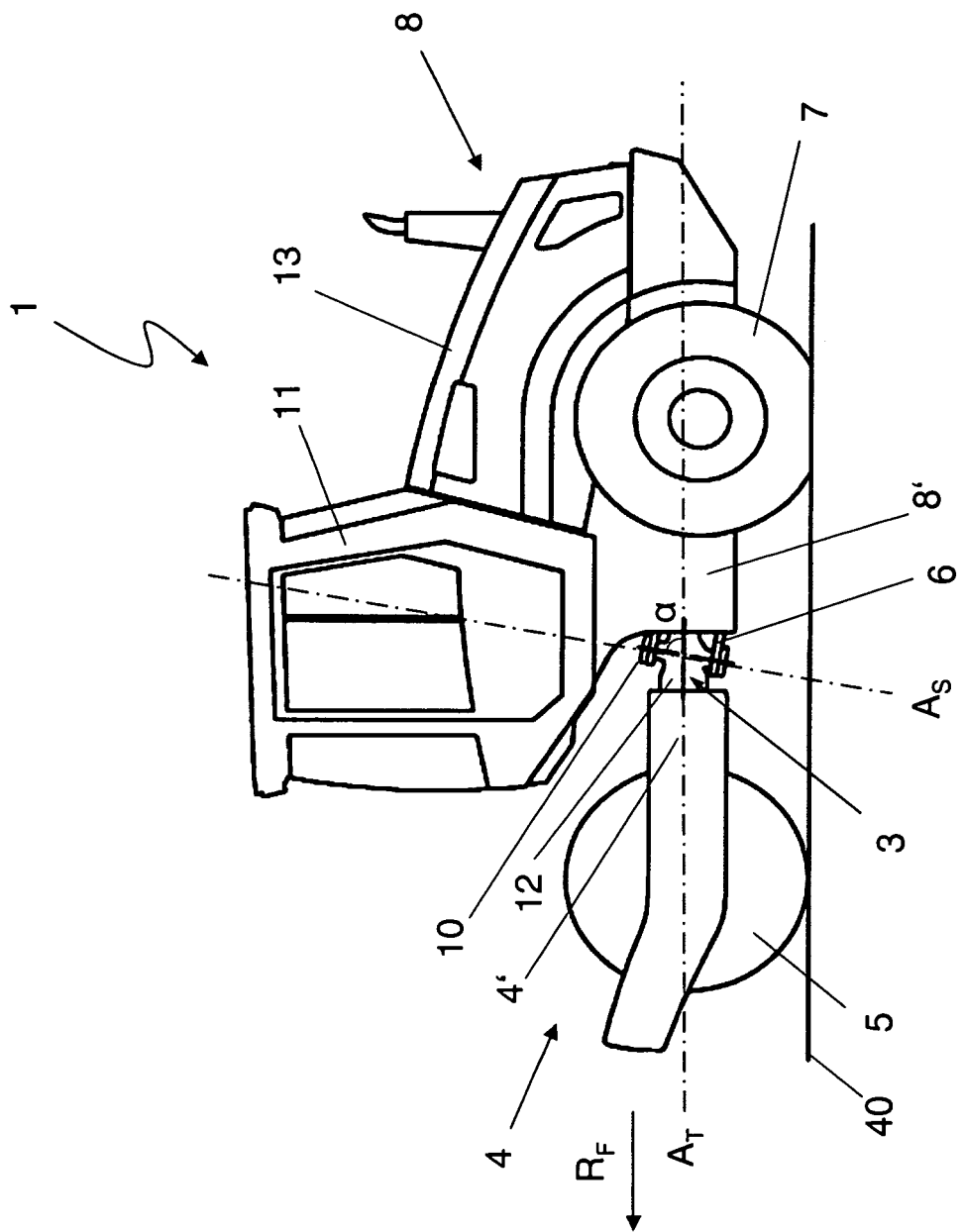
FIG. 1 shows a side view of an embodiment of a vehicle with a joint arrangement in accordance with the present invention.
Figure 2:
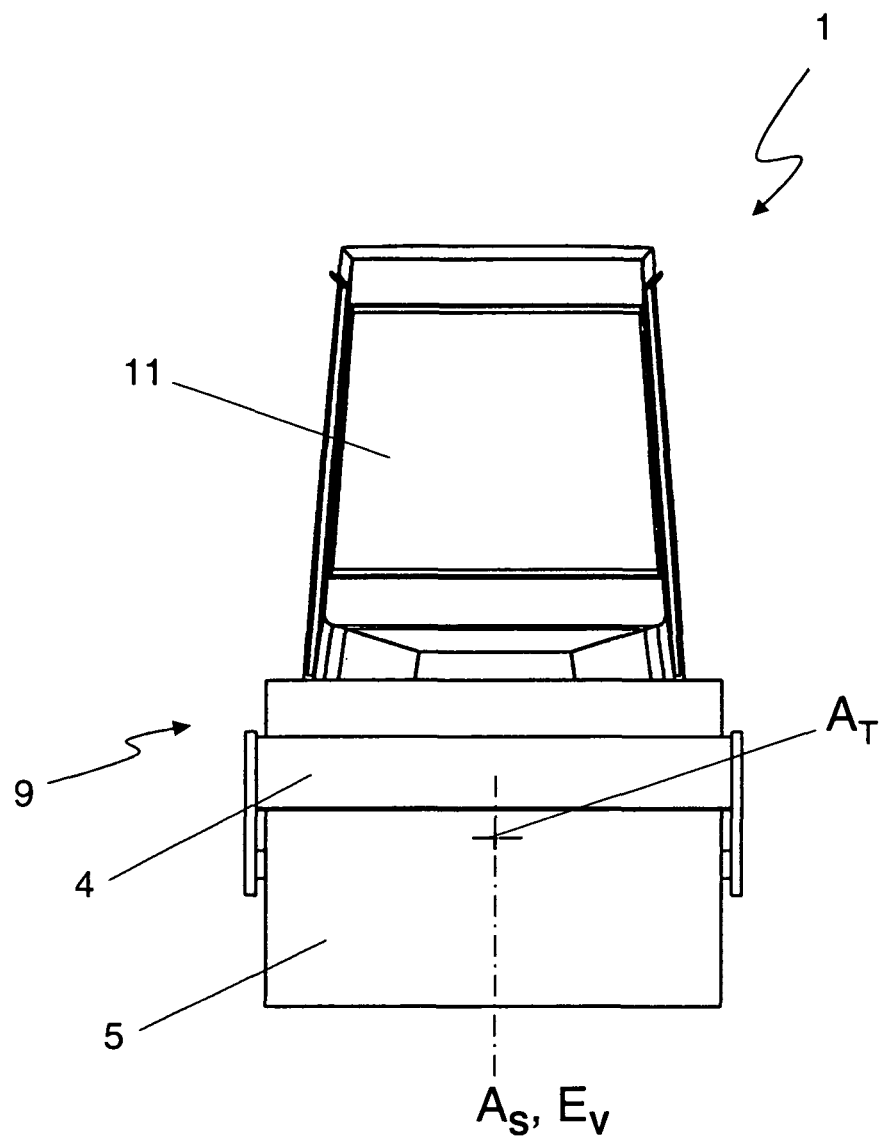
FIG. 2 shows a front view of the vehicle of FIG. 1.

FIGS. 1 and 2 show a vehicle in form of a vibration roller 1, especially a single-drum compactor, in a non-turned-in state, i.e., in the forward travelling direction $R_F$. The vibration roller 1 comprises a divided frame with a front frame part 4 and a rear frame part 8, which are connected to each other via a combined articulated pendulum joint, which shall be referred to below as joint arrangement 3. It comprises a chassis with a front drum 5 and pneumatic rear wheels 7. The drum 5 is arranged via a front-wheel carrier 4' on the front frame part 4 and the rear wheels 7 are arranged on a rear-wheel carrier 8' on the rear frame part 8. The vibration roller 1 can be moved in a very tight turning radius as a result of the joint arrangement 3 between the front frame part 4 and the rear frame part 8. A driver's cabinet 11 and a drive unit which is covered by a hood 13 are situated on the rear frame part 8.

For the purpose of forming this articulated coupling, the joint arrangement 3 comprises the series connection of an articulation joint 10 and a pendulum joint 12. The two frame parts 4, 8 can thus perform a pendulum motion and a pivoting motion relative to each other for performing a steering process of the vibration roller 1. The pendulum joint 12 comprises a front connection element 2 (FIGS. 6 to 11) which is connected to the front frame part 4 and the articulation joint 10 comprises a rear connection element 6 (FIGS. 6 to 11) which is connected to the rear frame part 8. The front and the rear connection element 2, 6 can be arranged as a separate component or integrally with the front or rear frame part 4, 8. The combined articulated pendulum joint is further formed in such a way that the articulation joint 10 and the pendulum joint 12 are directly connected to each other in that the pendulum joint 12 comprises a rotary body 14 (FIG. 6) or a torsion bearing element 22 (FIGS. 7 to 11), which is rotatably arranged on the front connection element (2) about the pendulum axis ($A_T$), wherein the joint part of the articulation element 10 which is complementary to the joint part of the articulation element 10 on the frame side is arranged on the rotary body 14 or the torsion bearing element 22.

The pendulum motion occurs by way of a torsion of the two connection elements 2, 6 (FIGS. 6 to 11) or the front and rear frame parts 4, 8 relative to each other about a pendulum axis $A_T$, which extends in the direction of the longitudinal axis of the vibration roller 1. In a position of "straight travel" of the joint arrangement 3, the pendulum axis $A_T$ also extends parallel to a flat ground surface 40.

A steering motion, i.e., the pivoting of the two frame parts 4, 8 relative to each other, occurs about a steering axis $A_S$, which is inclined about an acute angle $\alpha$ relative to the pendulum axis $A_T$ and intersects the pendulum axis $A_T$. The steering axis $A_S$ is further situated in the steering position of "straight travel" of the vibration roller 1 in the vertical central plane $E_v$ (FIG. 2) of the vibration roller 1. In the illustrated preferred embodiment, the steering axis $A_S$ is inclined to the rear. The direction to the rear shall mean the direction opposite to the forward travelling direction $R_F$, namely in the direction of the rear wheels 7, or a direction in which the vibration roller 1 is moved in the main operating state.

Figure 3:
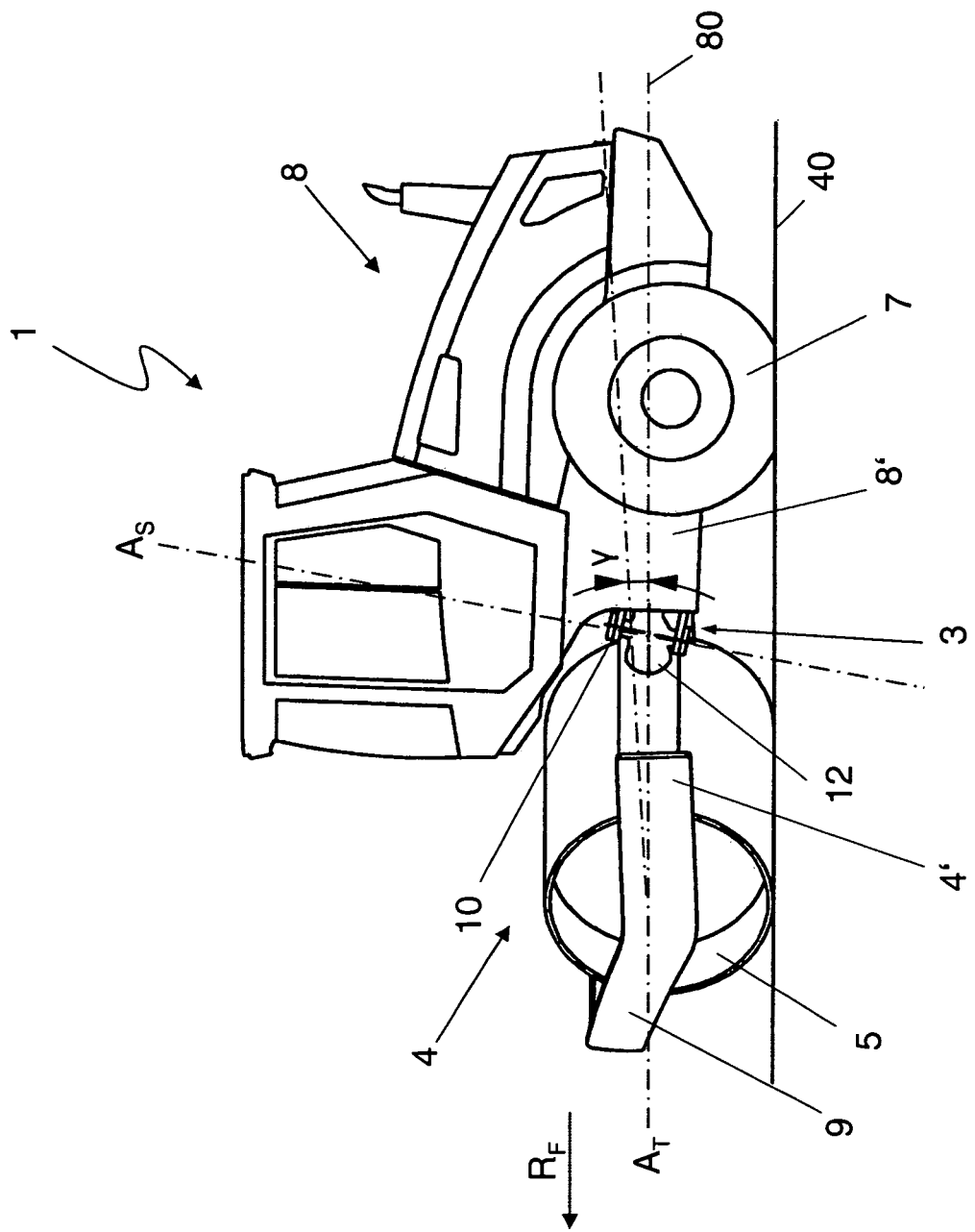
FIG. 3 shows the embodiment of FIGS. 1 and 2 in the turned-in state.
Figure 4:
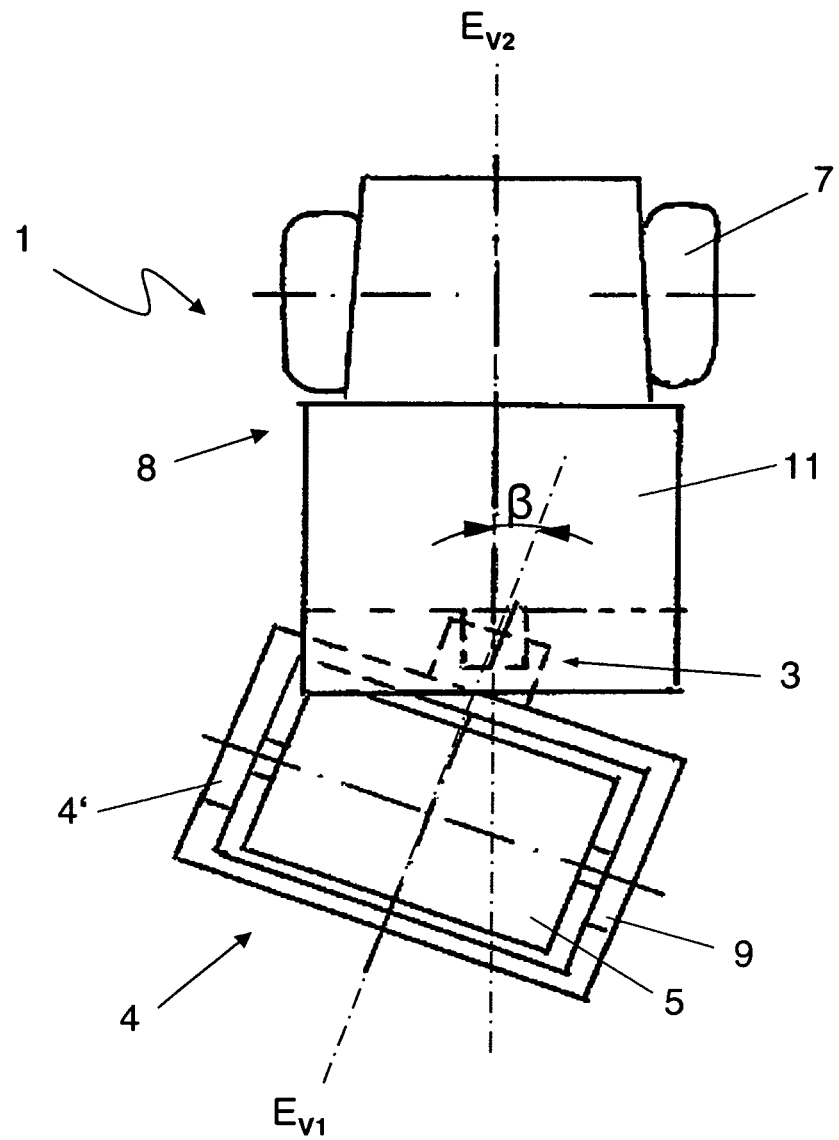
FIG. 4 shows a top view of the vehicle in the turned-in state according to FIG. 3.

In a turned-in position, as shown in FIG. 3 and FIG. 4 in forward travel by way of example for a steering angle $\phi$ (FIG. 4) to the right into the plane of the drawing, it is no longer possible to refer to a vertical central plane $E_v$ (FIG. 2) of the vibration roller 1, but to a vertical central plane $E_{v1}$ (FIG. 4) of the front frame part 4 and a vertical central plane $E_{v2}$ (FIG. 4) of the rear frame part 8. Furthermore, the pendulum axis leaves its alignment parallel to the ground surface 40 in the case of a steering angle. It remains within the vertical central plane $E_{v1}$ of the front frame part 4 however.

Figure 5:
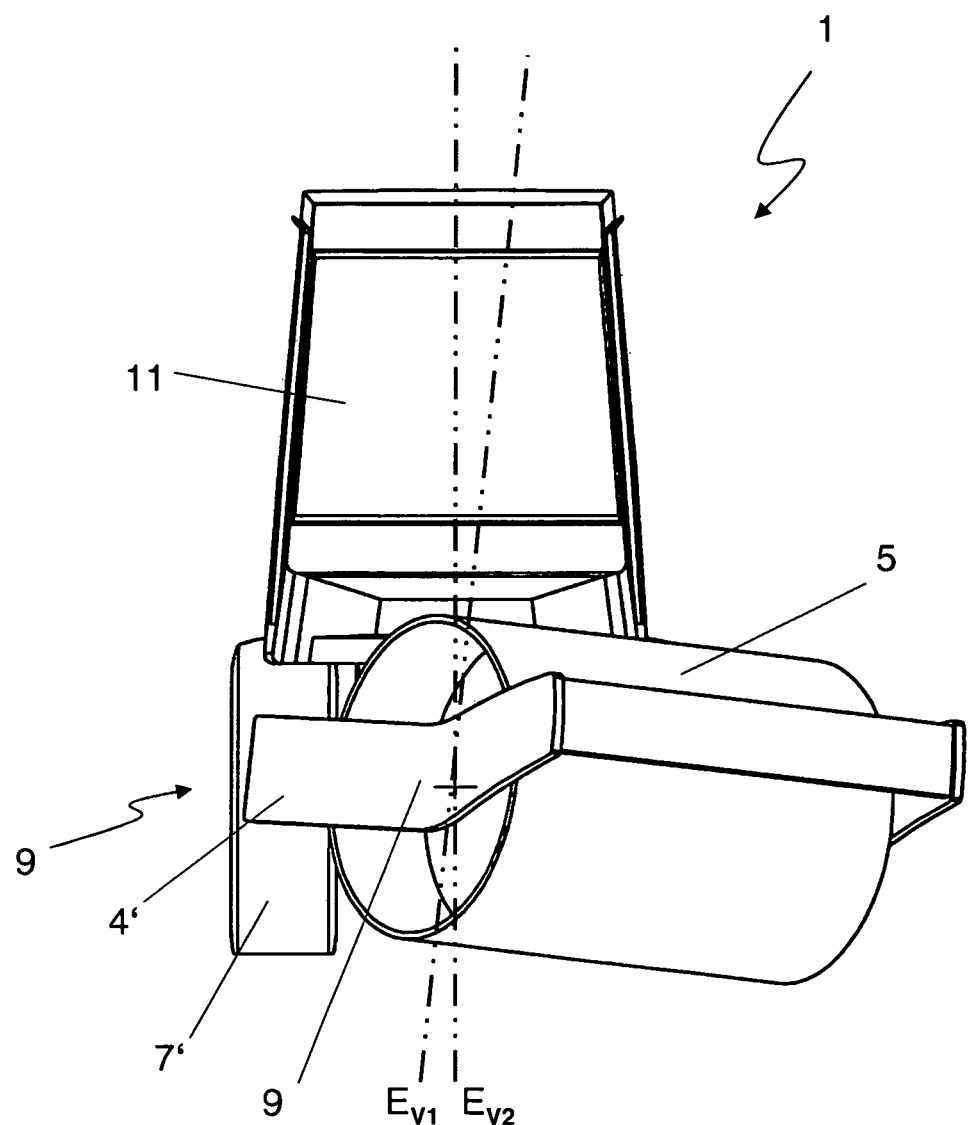
FIG. 5 shows a theoretical operating state of a vehicle in the turned-in state according to FIGS. 3 and 4.

This leads to a tilting moment on the front frame part 4 and the front wheel carrier 4' of the drum 5. However, it is prevented by compensation in the pendulum joint 12 that the part 9 of the front frame part 4 situated in the outer curve region will lift off, as is illustrated in FIG. 5 by way of example as a theoretical state for a steering angle to the left. Since the drum 5 rests on the ground, other than shown in FIG. 5, pendulum compensation takes place and the pendulum axis $A_T$ is deflected during the steering process by an angle $\gamma$ (FIG. 3) which changes with the steering angle $\beta$. The greater the steering angle the greater the angle $\gamma$. $\gamma$ is the angle which is formed by the pendulum axis $A_T$ and an imaginary plane 80 or a straight line extending parallel to the ground surface 40. During straight travel this angle is theoretically 0°, unless a different angle is chosen constructionally for straight travel.

In actual fact, the tilting moment acting on the frame parts 4, 8 leads to a shift in the centre of gravity and thus to an increase in the stability of the vibration roller 1. Furthermore, the rear wheel 7' which is on the outside in the curve is relieved and the load distribution on the rear wheels 7 becomes more constant. As a result of the geometric arrangement of the two frame parts 4, 8, there is an improved directional behaviour in straight travel, because the vibration roller 1 tries, as a result of the inclined steering axis $A_S$, to return from a turned-in state to straight travel. This is especially advantageous in the case of inadvertent turning in. Furthermore, the pendulum angle is upwardly limited with increasing steering angle, which reduces the likelihood of collision between the front and rear frame part 4, 8 of the vibration roller 1.

The embodiments according to FIGS. 6 to 11 respectively illustrate details of the joint arrangement 3, which allows a torsional movement of the front and the rear frame part 4, 8 relative to each other about the pendulum axis $A_T$ and a pivoting movement about the steering axis $A_S$, so that it acts as an articulated pendulum joint. Each embodiment is shown with a front connection element 2 and a rear connection element 6, via which the respective joint arrangement 3 is connected to the front and rear frame part 4, 8. The connection elements 2, 6 are preferably arranged as flanges. It is understood that the joint arrangement 3 can respectively alternatively also be directly arranged on the front and rear frame part 4, 8 in that the joint part of the pendulum joint 12 on the frame side and the parts of the articulation joint 10 on the frame side are arranged integrally with the front and rear frame part 4, 8. The joint aspect in all embodiments is the steering axis $A_S$ inclined to the rear in operative connection with the pendulum axis $A_T$, which is aligned in straight travel horizontally or in the longitudinal direction of the vibration roller 1.

Like parts are provided with like reference numerals in the embodiments of the joint arrangement 3.

Figure 6:
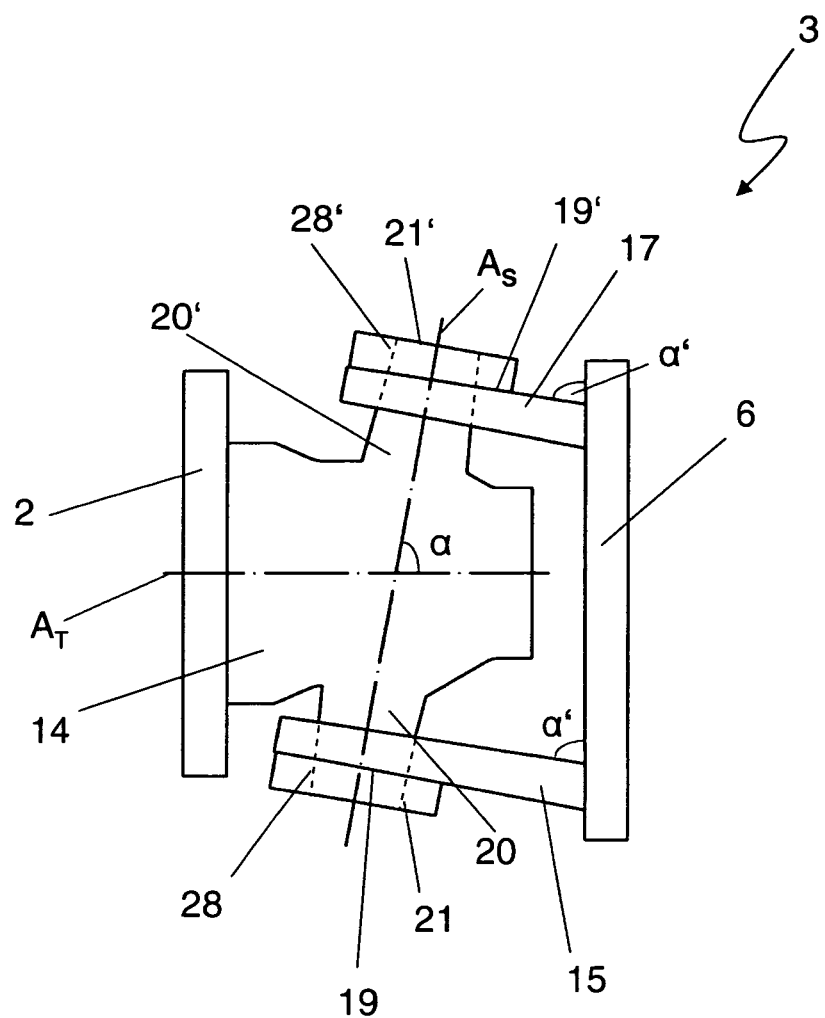
FIG. 6 shows a view of a first embodiment of the joint arrangement.

In the first embodiment of the joint arrangement 3 which is shown in FIG. 6, the pendulum joint 12 is arranged as a rotary body 14 which is rotatably arranged about the pendulum axis $A_T$ on the front connection element 2. The articulation joint 10 is formed on the one hand by two diametrically protruding joint pins 20, 20' on the rotary body 14 and on the other hand by two bearing eyes 28, 28', which are arranged on two parallel yoke legs 15, 17 on the rear connection element 6. The rotational axes of the joint pins 20, 20' and the associated bearing eyes 28, 28' extend coaxially to the steering axis $A_S$ which is inclined to the rear. The two yoke legs 15, 17 are connected to each other via the rear connection element 6.

In the example shown in FIG. 6, the two yoke legs 15, 17 are arranged orthogonally with respect to the steering axis $A_S$ and the rotational axes of the joint pins 20, 20', wherein they protrude upwardly from the rear connection element 6 in an inclined fashion under an angle β. They comprise flat bearing surfaces 19, 19', on which bearing counter-elements 21, 21' can be positioned in a custom-fit manner on the ends of the joint pins 20, 20' with respective bearing surfaces. An anvil shape is thus produced in this case, in particular, in which the bearing counter-elements 21, 21' transmit the axial forces acting on the joint pins 20, 20' to the yoke legs 15, 17.

In accordance with one embodiment of the present invention, the angle α' of the arrangement of the yoke legs 15, 17 which is inclined to the vertical is obtained by the inclination of the steering axis $A_S$ about the angle α relative to the pendulum axis $A_T$.

Figure 7:
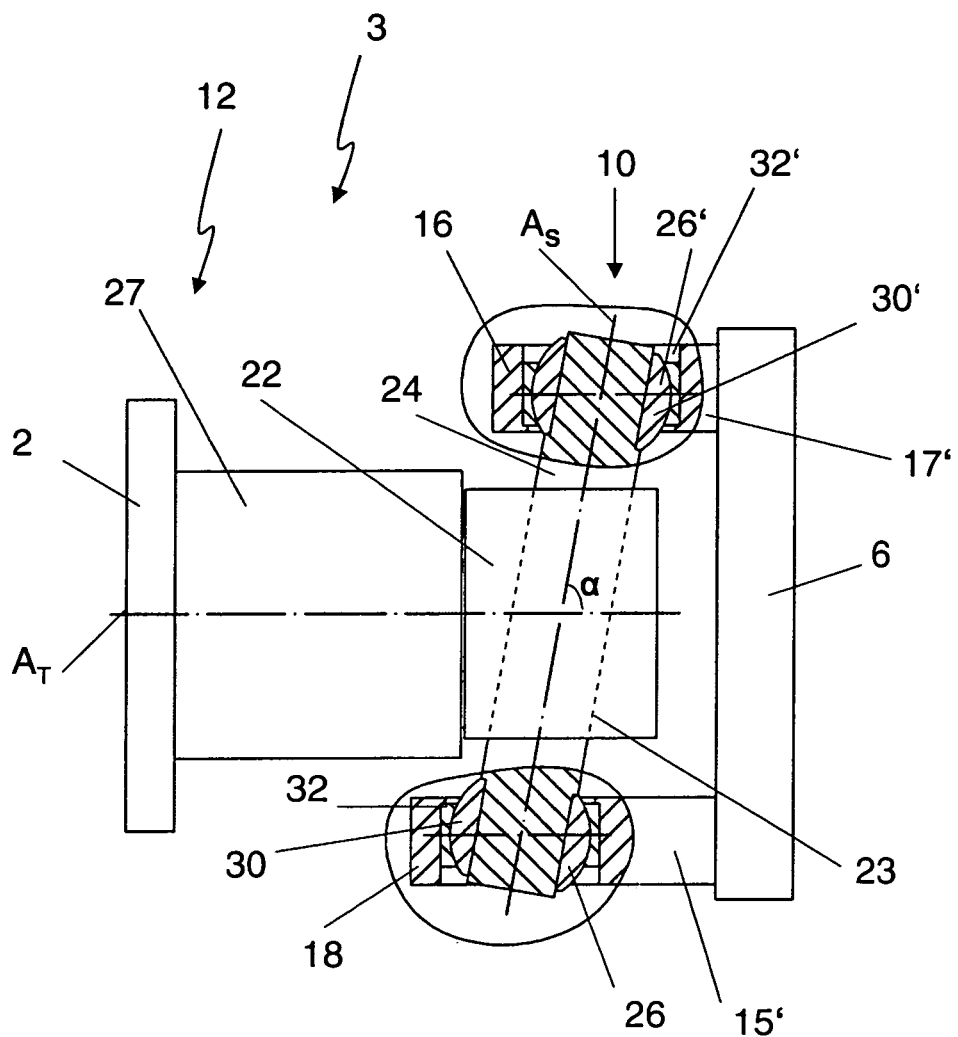
FIG. 7 shows a second embodiment of the joint arrangement in a partial sectional view.

In the second embodiment shown in FIG. 7, a torsion pin receptacle 27 is arranged on the front connection element 2, in which a torsion pin (not shown) of a torsion bearing element 22 is held. The pendulum joint 12 is formed in this manner, which allows torsion of the two connection elements 2, 6 relative to each other about the pendulum axis $A_T$. A cylindrical oblique borehole 23 is provided in this embodiment on the torsion bearing element 22, which borehole penetrates the torsion bearing element 22 completely and is inclined at an angle α in relation to the pendulum axis $A_T$. A bearing shaft 24 is accommodated in said borehole 23 such that its two ends protrude diametrically from the torsion bearing element 22. The two ends are connected to the yoke legs 15', 17' via ball-and-socket joints. The bearing shaft 24 is provided for this purpose at both of its free ends with bearing elements 26, 26', which are designed as spherical heads 30, 30'.

The yoke legs 15', 17' are aligned orthogonally to the rear connection element 6. An upper bearing element 16 and a bottom bearing element 18 are formed on said legs, which bearing elements comprise spherical head receptacles 32, 32'. The spherical heads 30, 30' are mounted in the spherical head receptacles 32, 32'. The bottom yoke leg 15' is longer than the upper yoke leg 17' as a result of the alignment of the steering axis $A_S$ to the rear, and the distance of the bottom bearing element 18 from the rear connection element 6 is greater than the distance of the upper bearing element 16 from the rear connection element 6.

The articulation joint formed in this manner enables both the introduction of torsion loads into the pendulum joint 12 and the transmission of pivoting movements between the front and the rear connection element 2, 6.

Figure 8:
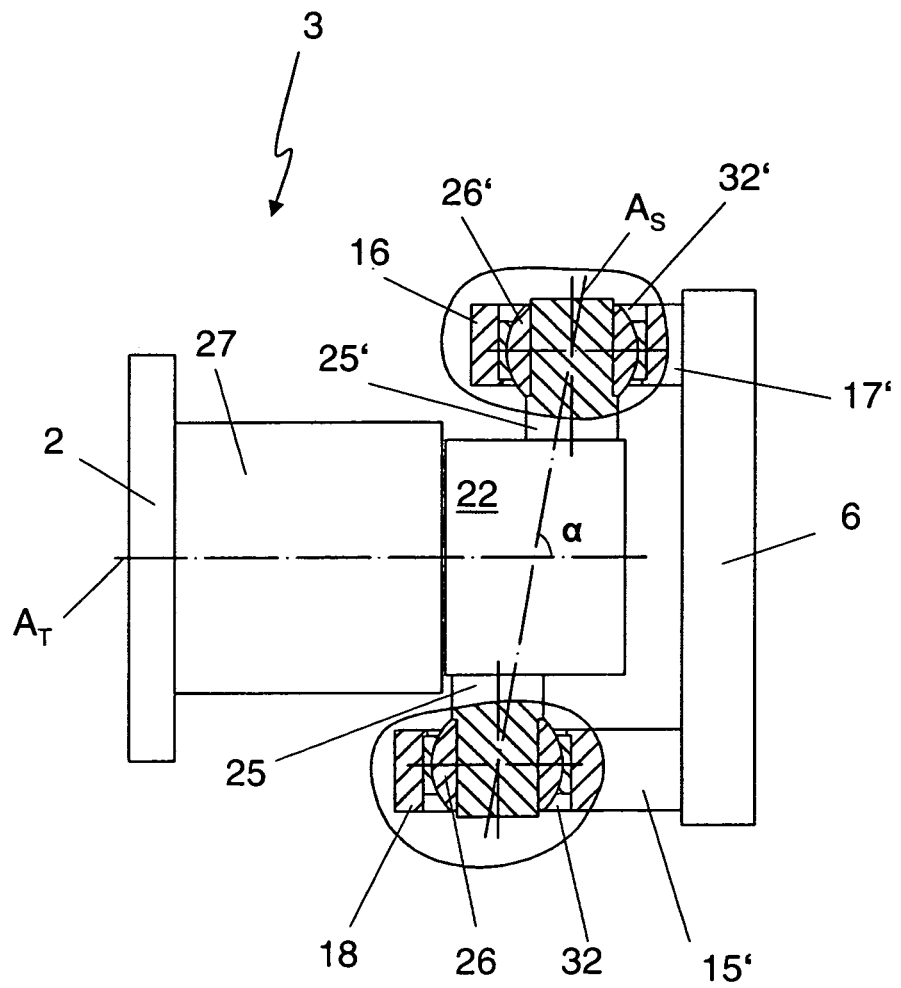
FIG. 8 shows a third embodiment of the joint arrangement in a partial sectional view.

The third embodiment shown in FIG. 8 differs from the second embodiment according to FIG. 7 in that two bearing shafts 25, 25' are arranged diametrically on the torsion bearing element 22 and are aligned in a precisely radial manner. In this embodiment, the bearing shaft 25, which carries the bottom bearing element 18, is offset to the front in the direction of the pendulum axis $A_T$, whereas the bearing shaft 25', which carries the upper bearing element 16, is offset to the rear. As a result, the bottom yoke leg 15' is longer than the upper yoke leg 17'. The inclination α of the steering axis $A_S$ is obtained from the offset of the two bearing shafts 25, 25' on the pendulum axis $A_T$ and the respective offset of the bearing elements 16, 18 arranged on the respective yoke legs 15', 17' as well as the distance of the two yoke legs 15', 17' from each other.

The yoke legs 15', 17' and the bearing elements 16, 18 are arranged in this embodiment offset in the direction of the pendulum axis $A_T$ with respect to an axis perpendicularly to the pendulum axis $A_T$. In particular, the bottom yoke leg 15' is arranged slightly longer than the upper yoke leg 17', so that the bearing elements 16, 18 are mounted on an axis inclined to the vertical, which in this case is an axis parallel and coaxial to the steering axis $A_S$.

Figure 9:
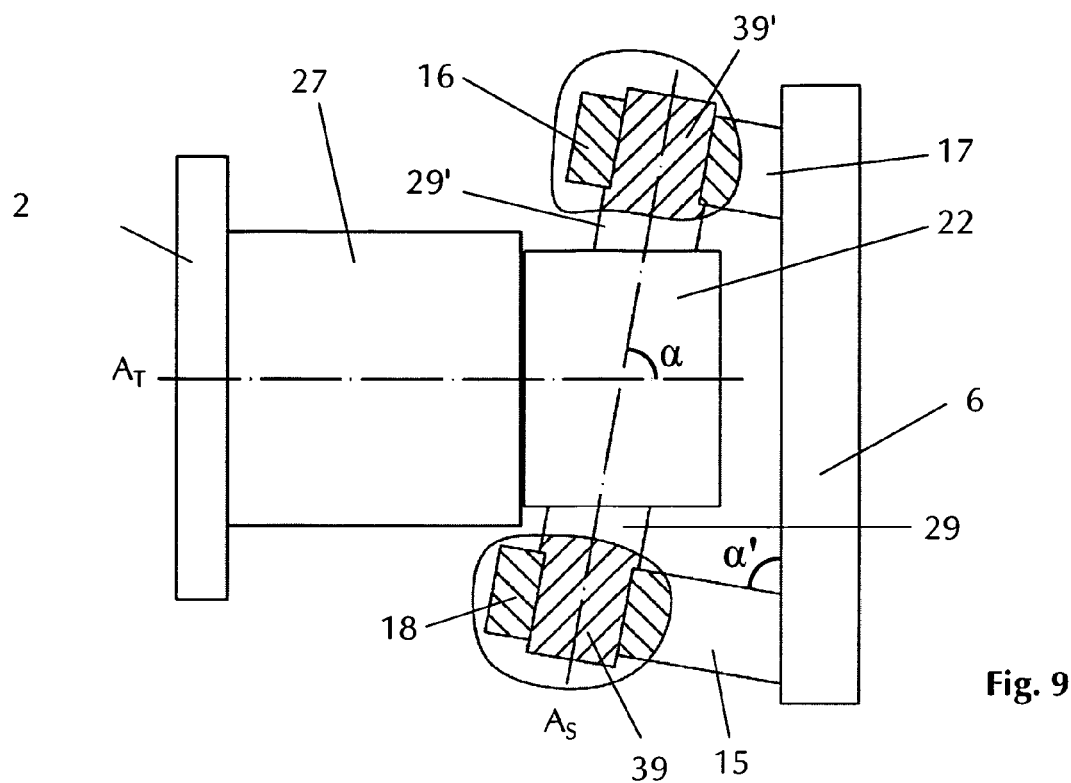
FIG. 9 shows a fourth embodiment of the joint arrangement in a partial sectional view.

In the fourth embodiment of the joint arrangement 3 according to FIG. 9, the two bearing shafts 29, 29' form a pair of shaft stubs. They are placed on the torsion bearing element 22 and are inclined to the rear by the angle α according to the first and second embodiment of FIG. 6 and FIG. 7. Accordingly, the two parallel yoke legs 15, 17 of different length are upwardly inclined about an angle α' as in the first embodiment, so that the steering axis $A_S$ is formed which is inclined to the rear about the angle α. The free ends of the bearing shafts 29, 29' are arranged as cylindrical pins 39, 39', which are mounted in an axially non-displaceable manner in respective bearing eyes 28, 28' in the yoke legs 15, 17.

Figure 10:
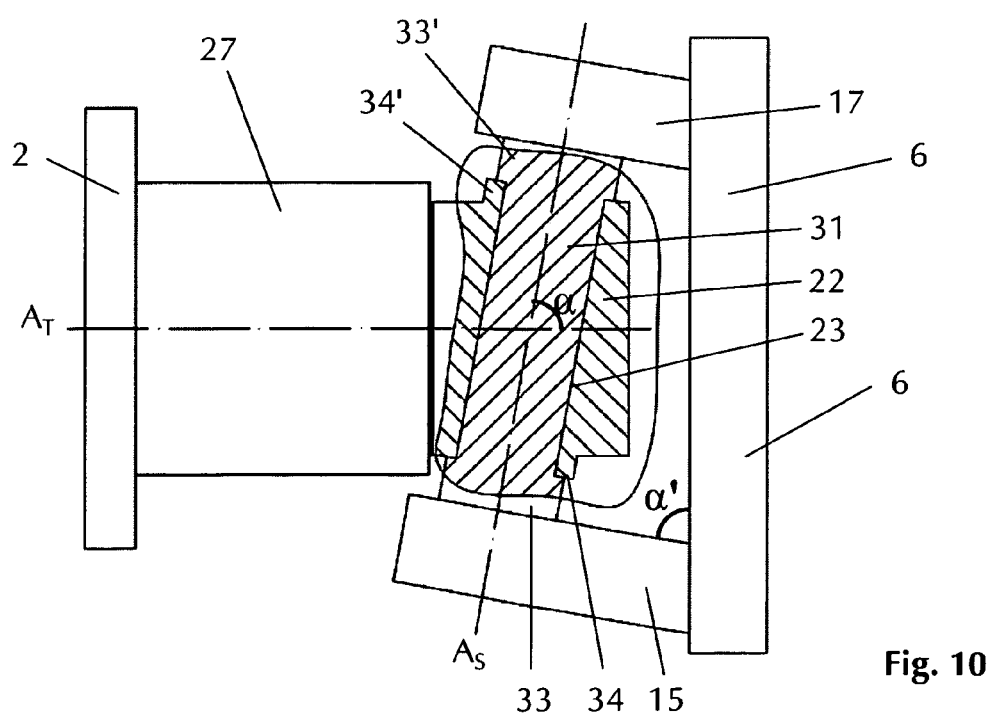
FIG. 10 shows a fifth embodiment of the joint arrangement in a partial sectional view.

The fifth embodiment according to FIG. 10 comprises a torsion bearing element 22 with a continuous cylindrical borehole 23 like the third embodiment according to FIG. 8, which borehole is inclined to the rear under an angle α and thus determines the inclination of the steering axis $A_S$. A bolt 31 is guided through the borehole 23, whose free ends are respectively provided with a collar 33, 33'. The bolt 31 is supported by the two collars 33, 33' in the axial direction on annular bearing surfaces 34, 34' on the torsion bearing element 22, which surfaces are arranged coaxially to the bolt 31.

Figure 11:
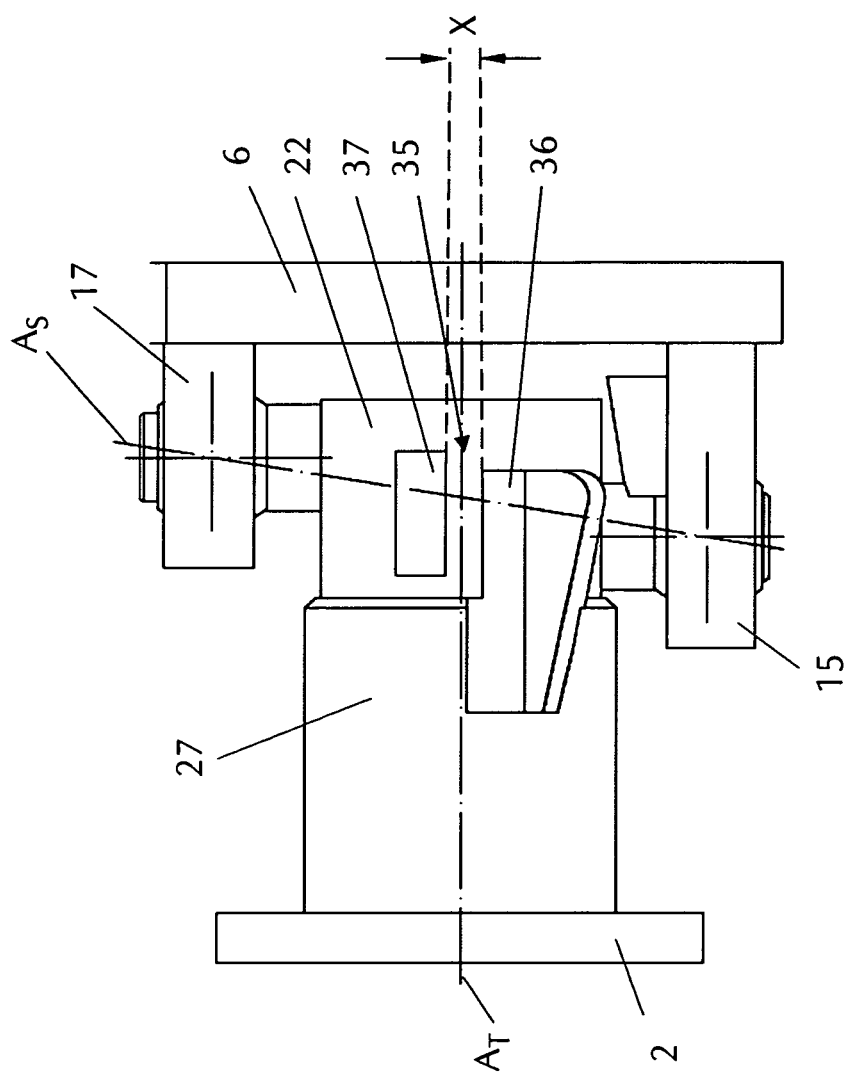
FIG. 11 shows a side view of a sixth embodiment of the joint arrangement during straight travel.
Figure 12:
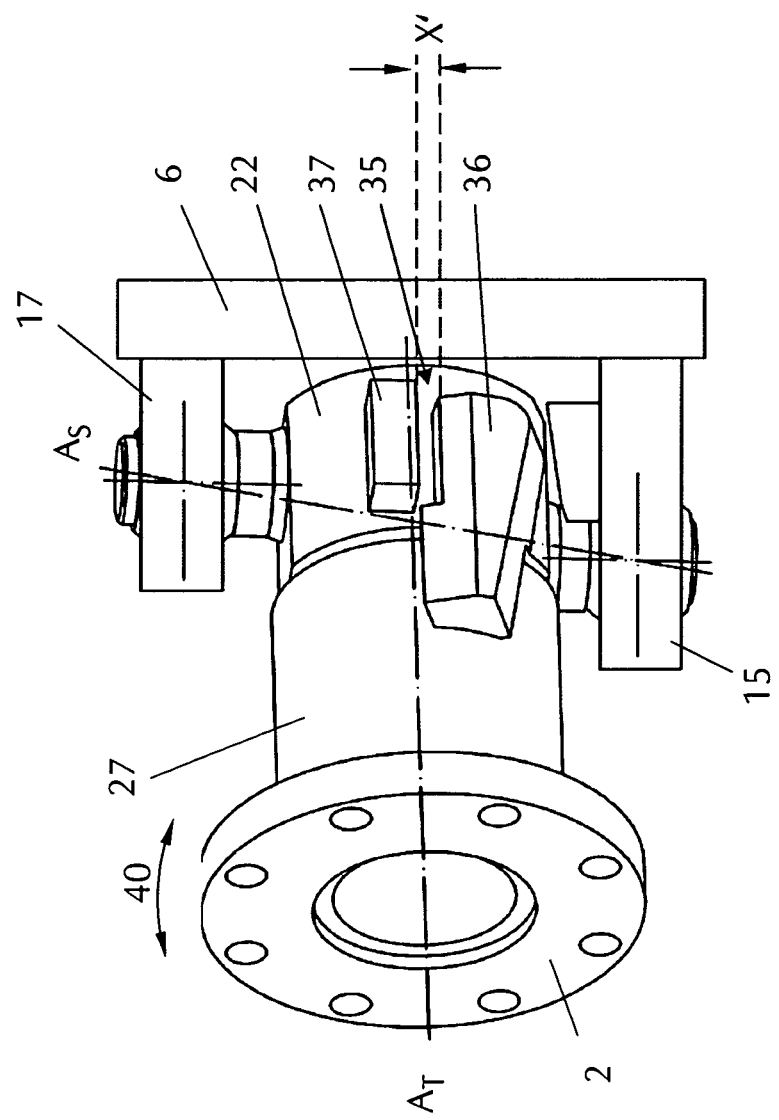
FIG. 12 shows a side view of the sixth embodiment in the turned-in state.

The sixth embodiment of the joint arrangement 3 illustrated in FIGS. 11 and 12 comprises a pendulum stop 35, consisting of a finger 36 and a stop 37, for limiting the pendulum angle in the upward direction depending on the inclination α of the steering axis $A_S$ and the steering angle β. Accordingly, the pendulum angle decreases in a counterclockwise manner according to double arrow 40 during the steering to the left with increasing steering angle β. During steering to the right, the pendulum angle decreases in a clockwise manner according to the double arrow 40 with increasing steering angle β. Apart from that, the joint arrangement 3 corresponds to the embodiment according to FIG. 8. FIG. 11 shows the joint arrangement 3 and the pendulum stop 35 during straight travel of the vibration roller 1 at a preferred pendulum angle of ±12°. In FIG. 12, the joint arrangement 3 with the pendulum stop 35 is shown in the turned-in state at a preferred maximum pendulum angle of ±6°.

FIGS. 11 and 12 illustrate the decrease in the pendulum angle in the counterclockwise manner during steering to the left. The measure X shown in FIG. 11 represents the pendulum angle during straight travel. FIG. 12 shows the state when the vibration roller 1 is steered to the left on the plane, i.e., the ground surface 40. X' represents the decreased measure of the residual pendulum angle.

The decrease in the pendulum angle in the clockwise manner during steering to the right occurs by a pendulum stop of identical design, which is arranged in a mirror-inverted manner on the right side of the joint arrangement 3 and is covered in the view of FIGS. 11 and 12 by the torsion pin receptacle 27 and the torsion bearing element 22.

Figure 13:
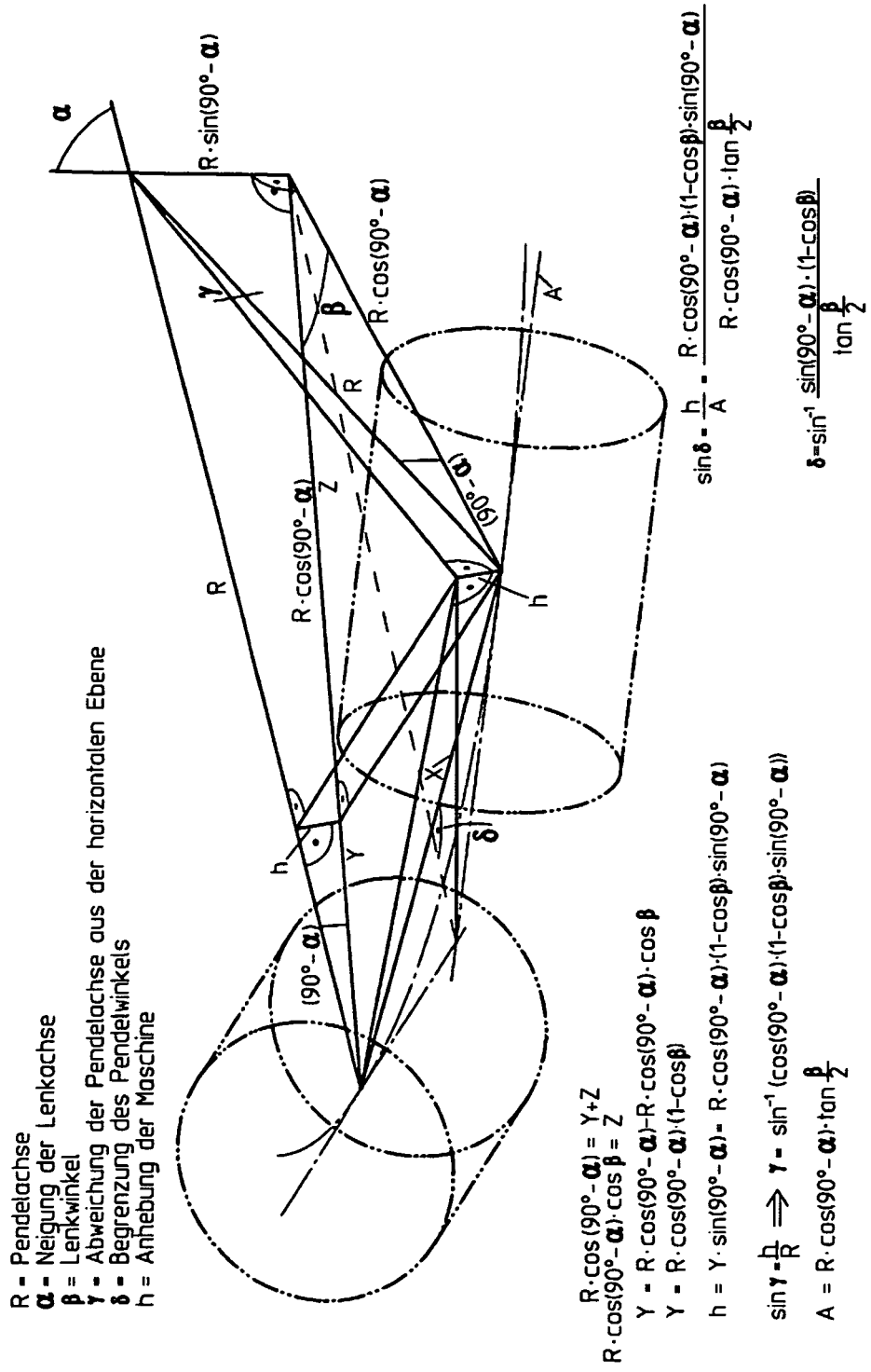
FIG. 13 shows a geometric view of relevant variables of the joint arrangement.

The required free space between the front and rear frame part 4, 8, and the front frame part 4 and the driver's cabinet 11 (FIG. 1), in particular, can thus be decreased by reducing the pendulum angle with increasing steering angle β and by lifting the vibration roller 1 in the region of the articulated joint arrangement 3 by the height h according to FIG. 13.

The dependence of the limitation angle δ about the pendulum axis $A_T$ on the angle of inclination α of the steering axis $A_S$ and the steering angle β is shown in the three-dimensional geometric illustration of relevant variables of the joint arrangement 3 according to FIG. 13.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A combined pendulum/articulation joint arrangement for an articulated vehicle, comprising:
    a front connection element connected to a front frame part of the articulated vehicle;
    a rear connection element connected to a rear frame part of the articulated vehicle;
    an articulation joint, via which the front frame part and the rear frame part are mutually connected in a pivotable manner relative to each other about a steering axis ($A_S$); and
    a pendulum joint, via which the front frame part and the rear frame part are mutually connected in a twistable manner relative to each other about a pendulum axis ($A_T$),
    wherein the joint arrangement comprises a combination of the pendulum joint and the articulation joint,
    wherein the pendulum joint comprises the front connection element and the articulation joint comprises the rear connection element, and the pendulum joint comprises a rotary body or a torsional bearing element which is rotatably arranged on the front connection element about the pendulum axis ($A_T$),
    wherein a joint part of the articulation joint, which is complementary to a joint part of the articulation joint on a frame side, is arranged on the rotary body or on the torsional bearing element,
    and further wherein the steering axis ($A_S$) of the articulation joint is inclined about an angle (α) relative to the pendulum axis ($A_T$) in a range between 85° and 65°, and that a pendulum stop of a pendulum angle is present depending on the inclination of the steering axis ($A_S$) and a steering angle (β).

2. The joint arrangement according to claim 1, wherein the pendulum stop is formed by a finger on the front frame part and a stop for the finger on the rotary body or the torsional bearing element.

3. The joint arrangement according to claim 1, wherein an angle of inclination α is 80°.

4. The joint arrangement according to claim 1, wherein the steering axis ($A_S$) is inclined in the direction of the rear frame part.

5. The joint arrangement according to claim 1, wherein the rear frame part comprises a yoke element with at least two mutually spaced bearing elements, and at least one bearing shaft and two bearing elements which are complementary thereto are provided between the front frame part, said bearing elements being in force-locking operative connection with the bearing elements.

6. The joint arrangement according to claim 5, wherein at least one bearing element comprises a spherical head, and the bearing element comprises a complementary spherical head receptacle.

7. The joint arrangement according to claim 5, wherein the bearing shaft is arranged in an inclined manner parallel to the steering axis ($A_S$).

8. The joint arrangement according to claim 1, wherein at least two bearing shafts are provided, which extend perpendicularly to the pendulum axis ($A_T$) and which are arranged with respect to an axis perpendicularly to the pendulum axis ($A_T$) in an offset manner with respect to each other along the pendulum axis ($A_T$).

9. The joint arrangement according to claim 5, wherein the bearing elements of the yoke element are arranged as an upper bearing element and a bottom bearing element, and wherein the bottom bearing element is arranged with respect to an axis perpendicularly to the pendulum axis ($A_T$) in an offset manner along the pendulum axis ($A_T$) with respect to the upper bearing element, or vice versa.

10. A joint arrangement according to claim 5, wherein the at least one bearing shaft is arranged on a torsional bearing element which engages with a joint pin in a rotatable manner in a torsional pin receptacle, or vice versa.

11. An articulated vehicle, comprising a front frame part and a rear frame part, on which respective driving means are arranged, and comprising a joint arrangement according to claim 1.

12. The joint arrangement according to claim 1, wherein the articulated vehicle comprises a construction vehicle.

13. The articulated vehicle according to claim 11, wherein the articulated vehicle comprises an articulation-steered construction machine.

* * * * *